(12) United States Patent
LaFerriere et al.

(10) Patent No.: US 6,797,042 B2
(45) Date of Patent: Sep. 28, 2004

(54) PYRAMID AIR CLEANER

(75) Inventors: Derek LaFerriere, East Hampton, CT (US); Dan Martin, Jr., Orlando, FL (US)

(73) Assignee: Pyramid Air Solutions, Inc., Merritt Island, FL (US)

( * ) Notice: Subject to any disclaimer, the term of this patent is extended or adjusted under 35 U.S.C. 154(b) by 90 days.

(21) Appl. No.: 10/177,705

(22) Filed: Jun. 21, 2002

(65) Prior Publication Data

US 2004/0020363 A1 Feb. 5, 2004

(51) Int. Cl.⁷ .......................... B01D 50/00; B01D 41/00
(52) U.S. Cl. .................... 95/273; 95/286; 55/472; 55/481; 55/486; 55/495; 96/224; 96/397
(58) Field of Search .................... 55/413, 414, 415, 55/467, 471, 472, 473, 481, 486, 490, 495, DIG. 37; 96/224, 397, 417; 95/273, 286

(56) References Cited

U.S. PATENT DOCUMENTS

| | | | |
|---|---|---|---|
| 3,838,556 A | * 10/1974 | Finger ....................... 55/385.1 |
| 3,900,301 A | 8/1975 | Constantinescu et al. ..... 55/257 |
| 4,095,965 A | 6/1978 | Neumann et al. ............. 55/270 |
| 4,750,917 A | 6/1988 | Fujii ............................ 55/6 |
| 4,990,313 A | 2/1991 | Pacosz ....................... 422/121 |
| 5,240,478 A | * 8/1993 | Messina ...................... 95/273 |
| 5,453,049 A | 9/1995 | Tillman, Jr. et al. ........ 454/228 |
| 5,612,001 A | 3/1997 | Matschke .................. 422/121 |
| 5,616,172 A | 4/1997 | Tuckerman et al. ........... 96/16 |
| 5,681,374 A | 10/1997 | Von Glehn .................... 96/16 |
| 5,837,040 A | 11/1998 | Caughron et al. ............ 96/224 |
| 5,879,435 A | 3/1999 | Satyapal et al. ............... 96/16 |
| 5,891,399 A | 4/1999 | Owesen ....................... 422/121 |
| 5,997,619 A | 12/1999 | Knuth et al. .................. 96/224 |
| 6,322,614 B1 | 11/2001 | Tillmans ....................... 96/16 |

* cited by examiner

Primary Examiner—Robert A. Hopkins
(74) Attorney, Agent, or Firm—Brian S. Steinberger; Law Offices of Brian S. Steinberger, P.A.

(57) ABSTRACT

A self contained air purification pyramid shaped system and apparatus that can form up to approximately 300 cfm of air flow at high speed, that can remove allergy causing particulates, microorganisms, and odors/chemicals from the air so as to create a healthier environment. The system and apparatus can use a carbon prefilter for removal of larger particulate and odors/chemicals and gases, a UV(ultra violet) lamp for destruction of bacteria, viruses, and molds, and a hospital grade HEPA filter (approximately 99.97% efficient at approximately 0.3 microns) for removal of smaller particulate and bacteria. Air can first enter the peak of the pyramid shaped apparatus, pass through a carbon prefilter, past the UV lamp(s), through filter, such as a HEPA filter, and through a motorized impeller which pushes the air out lower sides of the apparatus. In addition to attacking airborne bacteria and viruses, the UV lamp can continually bathe the "dirty" side of the HEPA filter (the side of the filter on which the microorganisms are collected), thereby deactivating any microorganisms that have been collected and preventing bacteria/mold growth on the HEPA. The invention can be used in commercial, personal and any environment for improving indoor air quality. Embodiments can include floor supported stand, a table top version and a mount for securing to a wall.

37 Claims, 8 Drawing Sheets

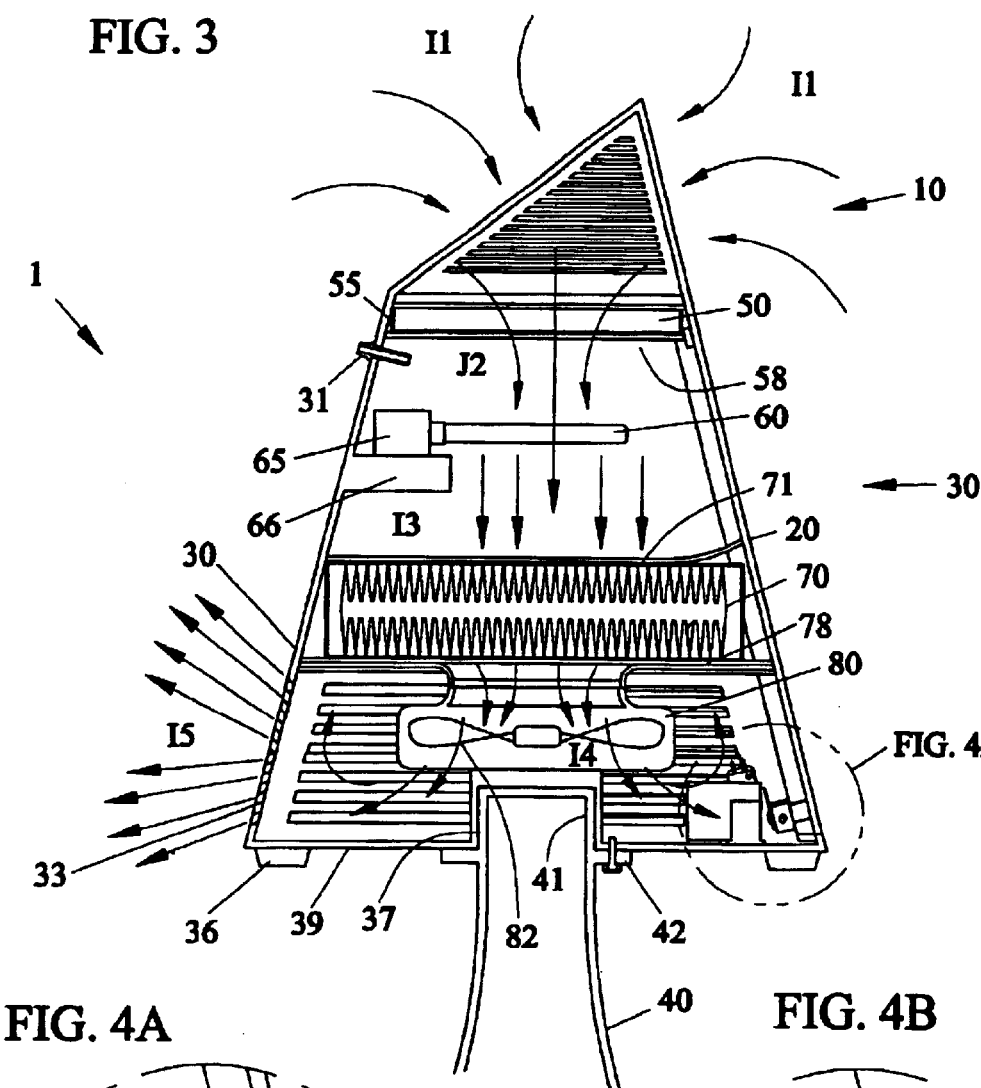
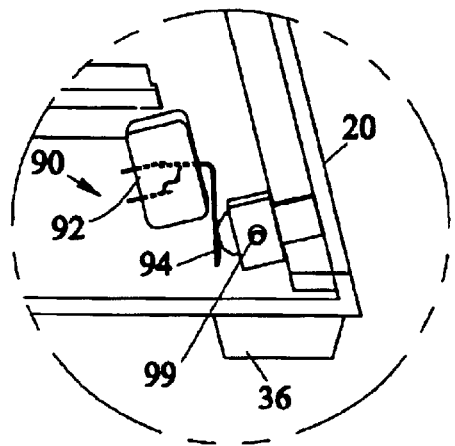
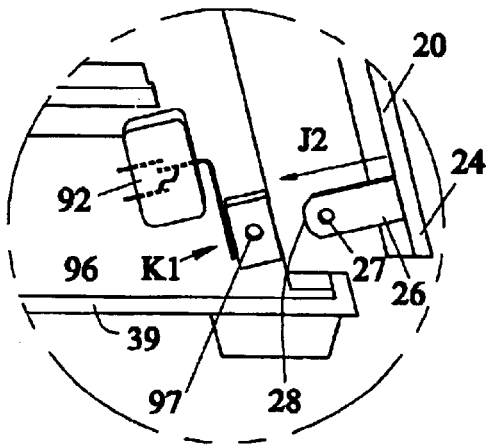

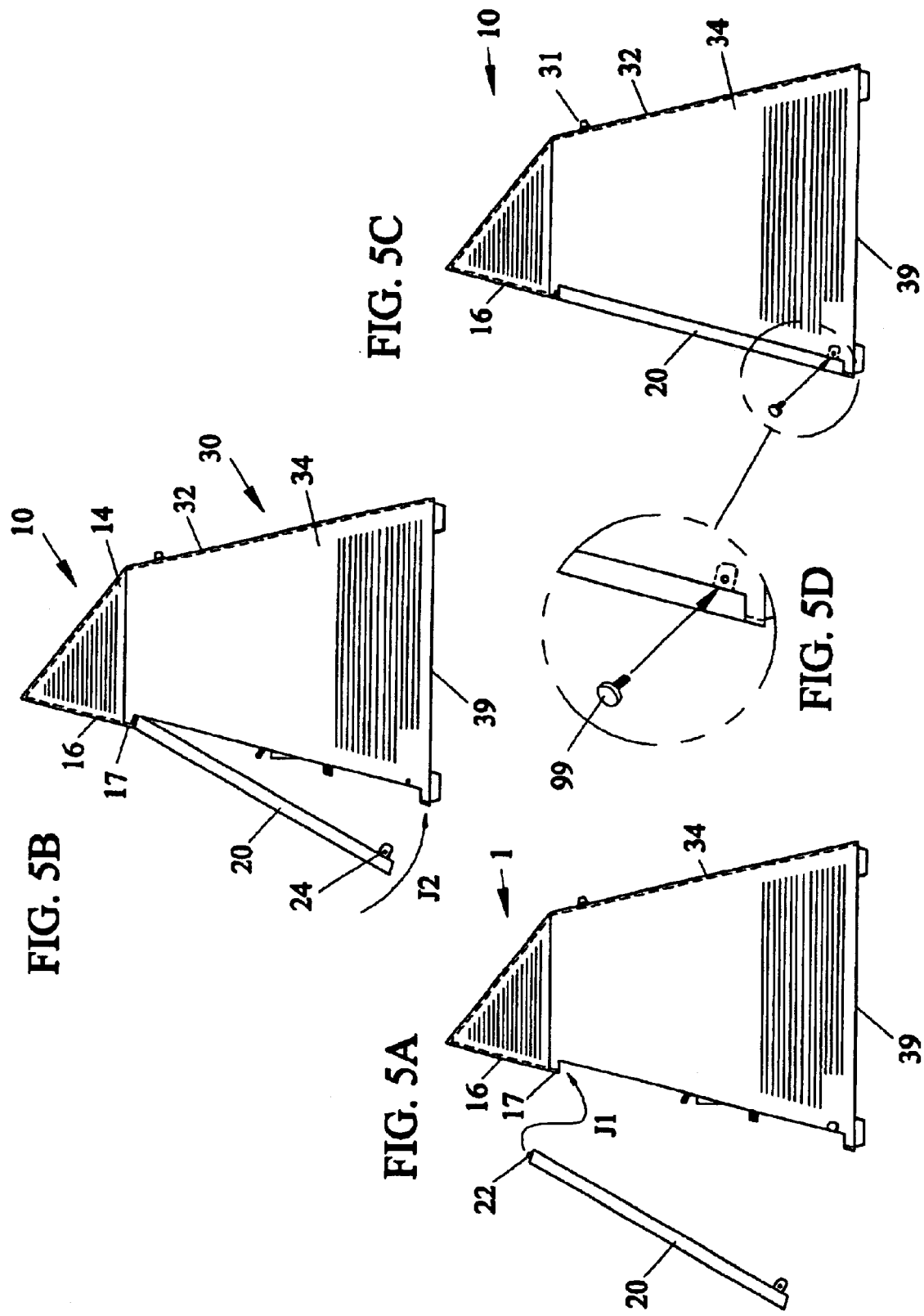

PYRAMID AIR CLEANER

This invention is directed to air cleaners, in particular to an apparatus and method of operating an air cleaner having a generally pyramid structure where air enter the apparatus from the peak, travels through carbon prefilter, past UV lamp(s) through a HEPA filter and past a motorized impeller which passes the cleaned air out lower sides of the apparatus.

BACKGROUND AND PRIOR ART

Various air cleaner devices have been proposed over the years with limited success as to solving all the problems air cleaning indoor air. For example, many of these air filters will pull air in from lower sides of a unit having a rectangular shape and distribute the air from an upper portion of the unit. This typical unit shape and air flow arrangement can have several drawbacks. For example, the inlet portals on these rectangular units are generally identical in size to the outlet portals or are sometimes smaller. Thus, air distribution can be limited by the sizes of the inlet and outlet portals. Furthermore, by constantly pulling in air from the bottom can result in not getting all the circulating contaminants in the space to be cleaned. For example, contaminants found in warm air can be rising upward and would not necessarily be pulled in by the bottom located inlet portions of typical air cleaner units. Additionally, having only an air outlet on top of the air cleaner does not adequately distribute air being cleaned about a room space since the exhausted air is not being circulated about the space, and because these outlets typically blow air in only one direction (i.e. to only one portion of the room). Furthermore, having distribution outlet ports that are perpendicular to one another can also result in creating dead spaces between the exhausted air where clean air is not being circulated. And having the air inlet and air outlet in close proximity to one another will result in short-circuiting of the air, whereby exhausted air is drawn directly back into the unit so that the device is simply recycling cleaned air.

Other problems are that many air cleaner devices use only use one type of filter which can give the consumer a false sense of security that the air is being properly cleaned. For example, a unit only having a carbon type filter may absorb odors and chemicals but not be able to remove all sizes of air circulating particulates and contaminants. Similarly, units only having a filter such as a HEPA filter can remove particulates but not be able to remove many odors and chemicals. And a unit containing only a UV lamp can possibly only remove microorganisms and potentially odors and chemicals, but it will not be able to remove dust and particulate.

Additionally, many air cleaners that use HEPA filters do not test the filters to adequately determine their effectiveness. Thus, users can have a false sense of security that just having a HEPA filter is enough to adequately remove high percentages of undesirable particulates.

Still further problems with air cleaners are that the filters are not properly sealed and/or positioned in the path of air being cleaned within the units. For example, many air cleaner devices have filters loosely fitted inside and/or having open spaces about edges of the filter(s) so that dirty air is pulled around the filter(s) and is subsequently continuously ejected without being cleaned.

Still furthermore, traditional air cleaner units require continuously replacing the filters because of bacterial and mold growth on the filter(s). The prior art units are generally built to require constant servicing of either continuously buying new filter(s) and/or separately servicing the units to clean the existing filter(s). For example, as microorganisms collect on the HEPA filter over a long period of time, there is a risk of bacteria and mold growth on the HEPA filter as trapped bacteria/mold live, grow, and feed on the filter (especially in warm and humid environments). This is sometimes called bacteria "grow-through" whereby microorganisms live and breed on the HEPA media, eventually eating through the media. This ruins the integrity of the HEPA filter and possibly creates more contamination within the room as the microorganisms/mold are dispersed by the air cleaner. Time and labor and parts are constant continuous costs with these prior art air cleaning units.

Air cleaners that use UV(ultra violet) type lamps can also have additional problems with the UV lamps. A limitation of most UV air cleaner systems is that there is rarely enough UV dosage created to destroy bacteria or viruses. This is primarily because not enough residence time is achieved, in that the small number of lamps used in most units does not create enough radiation intensity to overcome the air flow in the unit. Current air cleaner units do not have the capability to kill all the bacteria and mold growth of both air flowing through these units and the bacterial and mold growth that builds up on components such as the filter(s) within the units.

Many United States patents have been proposed for cleaning indoor air but fail to adequately overcome all the problems described above. See for example, United States Patents: U.S. Pat. No. 3,900,301 to Constantinescu; U.S. Pat. No. 4,750,917 to Fuji; U.S. Pat. No. 4,905,965 to Neumann et al.; U.S. Pat. No. 4,990,313 to Pacosz; U.S. Pat. No. 5,453,049 to Tillman, Jr. et al.; U.S. Pat. No. 5,612,001 to Matschke; U.S. Pat. No. 5,616,172 to Tuckerman et al.; U.S. Pat. No. 5,681,374 to Von Glehn; U.S. Pat. No. 5,837,040 to Caughron et al.; U.S. Pat. No. 5,879,435 to Satyapal et al.; U.S. Pat. No. 5,891,399 to Owesen; U.S. Pat. No. 5,997,619 to Knuth et al.; U.S. Pat. No. 6,322,614 to Tillmans.

SUMMARY OF THE INVENTION

The first objective of the present invention is to provide an air purification apparatus and system where dirty air is drawn through the upper sides of a generally pyramid shape where it is cleaned, and is exhausted from lower side portions of the shape at high speed in order to be effectively and efficiently circulated throughout a space. The invention can allow for safely and efficiently circulating up to approximately 300 cfm of airflow at various speeds.

The second objective of the present invention is to provide an air purification apparatus and system that can continuously clean incoming air and the air filter(s) within the apparatus. A preferred embodiment can use the same UV(ultra violet) lamp(s) to both clean incoming air and clean the filter(s) within the apparatus by continuously bathing the filter(s) with UV light.

The third objective of the present invention is to provide an air purification apparatus and system that can use hospital grade technology. The preferred embodiments can use both certified HEPA filters combined with UV(ultra violet) lamp(s) to clean the air. Filters in the invention can be further tested for their effectiveness before being used.

The fourth objective of this invention is to provide an air purification apparatus and system that can adequately seal removable filters within the apparatus so that incoming air does not bypass around the air filter(s) within the apparatus.

The invention adequately prevents air being drawn into the apparatus from not being cleaned by sealing the filter(s) into the path of airflow inside the apparatus.

The fifth objective of the present invention is to provide an air purification apparatus and system that is versatile for maximum effectiveness without taking up valuable space by being able to be positioned on various floor locations by a removable stand.

The sixth objective of the present invention is to provide an air purification apparatus and system that is versatile for maximum effectiveness without taking up valuable space by being able to be supported on various table surfaces such as a desk or end table.

The seventh objective of the present invention is to provide an air purification apparatus and system that is versatile for maximum effectiveness without taking up valuable space by being able to be removably mounted to various wall height locations.

The eighth objective of the present invention is to provide an air purification apparatus and system that allows all replacement parts to be easily accessed and replaced. A back panel can be unclipped, and parts such as filters and lamps can be slid and/or popped out. Other than a basic tool such as a screw driver, no other tools are generally needed for regular maintenance of the apparatus.

The ninth objective of the present invention is to provide an air purification apparatus and system having a safety feature that shuts off power to internal components when the apparatus is being serviced. A safety interlock can be used that shuts off power when a back service panel is opened so that internal components such as electrical circuitry, blower, UV lamp(s), etc. can be safely handled.

Preferred embodiments of the novel apparatus, system and method for cleaning air includes a self contained air purification cabinet having sloped angled exterior walls, an air inlet port adjacent to a top portion of the cabinet for receiving incoming air, and various filtering stages within the cabinet for cleaning the incoming air. A blower type fan can pull the air into and exhaust cleaned air out of the cabinet. The preferred embodiments of the cabinet can have the shape of an upright pyramid with the air inlet port on at least one upper face portion of the pyramid shape, and the exhaust port on at least one lower face of the pyramid shape. The air inlet port can be located on two faces of the pyramid, and the upper pyramid portion can have at least one face with a different slanted angle than at least one other face. The exhaust ports can be located on three faces of the pyramid. The pyramid shape can include three exterior faces, four exterior faces, five exterior faces. The novel invention can circulate up to approximately 300 cfm of cleaned air.

The inside of the novel cabinet can include three different filtering stages. One stage can include a pre-filter for removing odors, chemicals and large particulates, such as a carbon filter. Another stage can include a light source such as a UV(ultraviolet) lamp(s), that can be the second stage. The third stage can include a main type filter for removing small particulates. A HEPA filter tested to achieve up to approximately 99.97% efficiency at approximately 0.3 microns, can be used as the main filter.

The filtering stages can be oriented such that the light source simultaneously cleans both the incoming air and the surface of the main filter that collects particulates and contaminants where microorganisms and mold become collected.

The filter(s) within the novel cabinet can be easily removed by being slid in and out of the cabinet Additionally, seals such as gasket materials can be used along the edges of the filter(s) so that incoming air does not bypass the filter(s) inside the cabinet.

A removable back panel can be attached to the cabinet so that components within the apparatus can be serviced without using extra tools to open and access the components in the apparatus. A safety switch can be used to automatically turn off power to the cabinet when the back panel is opened.

A removable floor based stand can be used for positioning the cabinet above various floor locales. Without the stand the novel invention includes rubberized feet for supporting the cabinet on surfaces such as tables, and the like, and the rubber feet also act as a cushion to prevent noise and vibration. A wall mount can also be used for attaching the novel air cleaning cabinet to various wall height positions.

Further objects and advantages of this invention will be apparent from the following detailed description of a presently preferred embodiment which is illustrated schematically in the accompanying drawings.

BRIEF DESCRIPTION OF THE FIGURES

FIG. 3 is a side cross-sectional view of the assembled apparatus of FIG. 2C showing air flow.

FIG. 4A is an enlarged view of the safety interlock switch of FIG. 3 with a closed back panel.

FIG. 4B is another view of the interlock switch of FIG. 4A with back panel being opened.

FIG. 5A is a side view of the apparatus of the preceding figures separated from the back panel.

FIG. 5B shows the apparatus of FIG. 5A with upper edge of back panel being connected.

FIG. 5C shows the apparatus of FIG. 5B with back panel now moved to a closed position.

FIG. 5D is an enlarged view of the locking fastener for the back panel of the apparatus.

DESCRIPTION OF THE PREFERRED EMBODIMENTS

Before explaining the disclosed embodiments of the present invention in detail it is to be understood that the invention is not limited in its application to the details of the particular arrangement shown since the invention is capable of other embodiments. Also, the terminology used herein is for the purpose of description and not of limitation.

Figure 1:
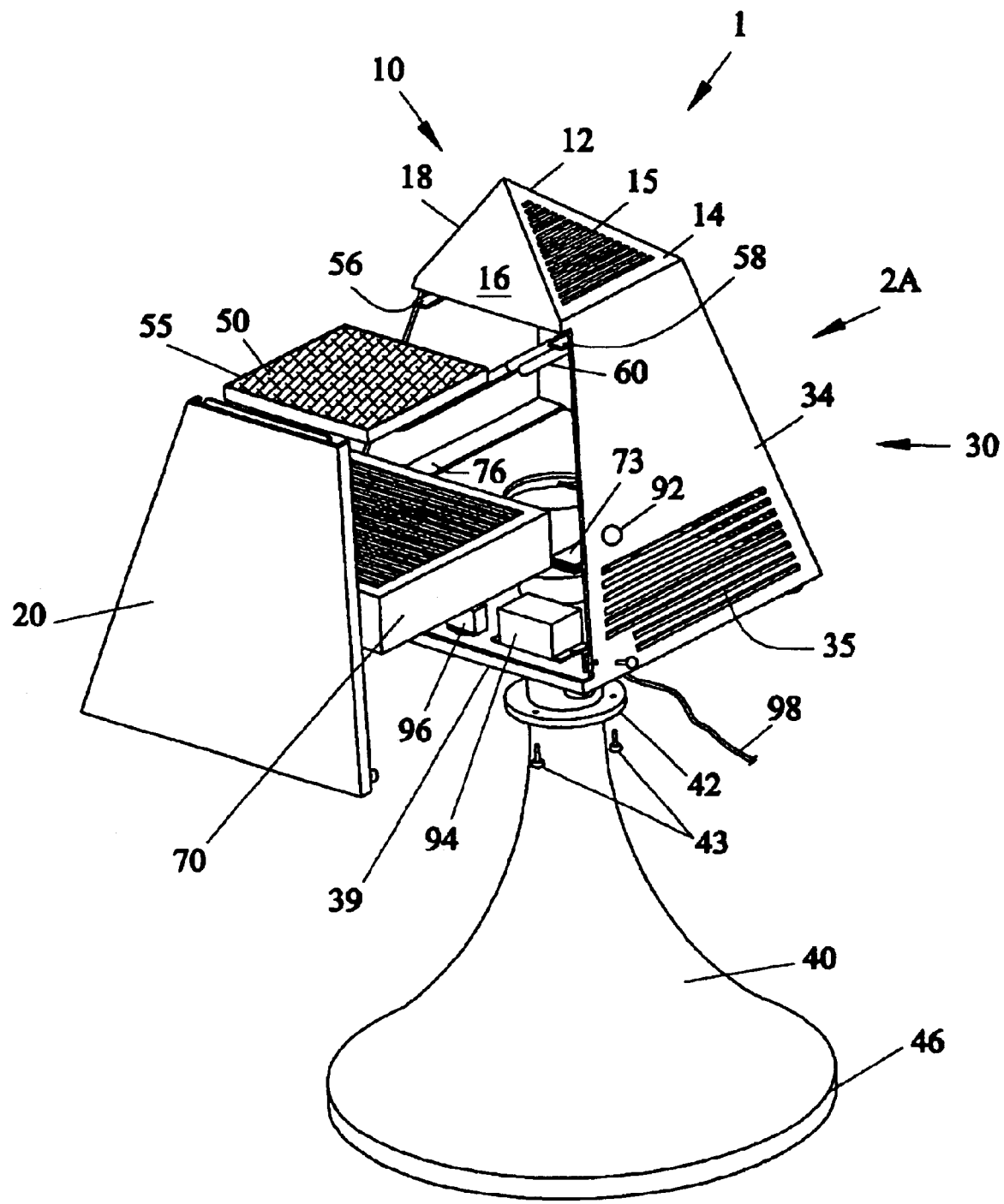
FIG. 1 is an exploded perspective view of a first preferred embodiment of the self-contained air cleaning and circulating pyramid invention apparatus with removable floor stand.
Figure 2B:
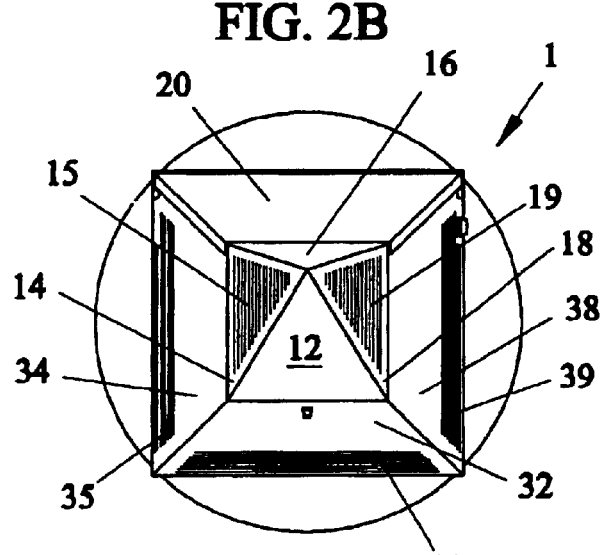
FIG. 2B is a top view of the assembled apparatus of FIG. 2A along arrow 2B.
Figure 2A:
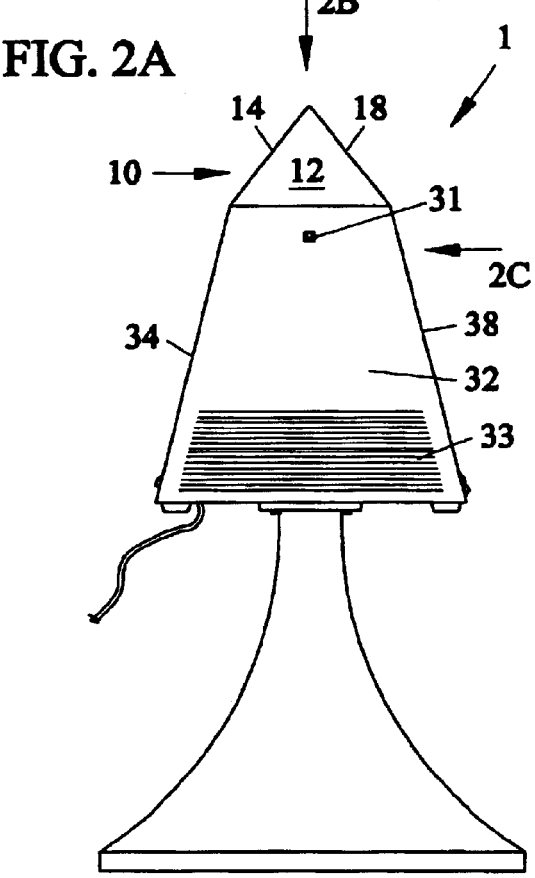
FIG. 2A is a front view of the assembled apparatus of FIG. 1 along arrow 2A.
Figure 2C:
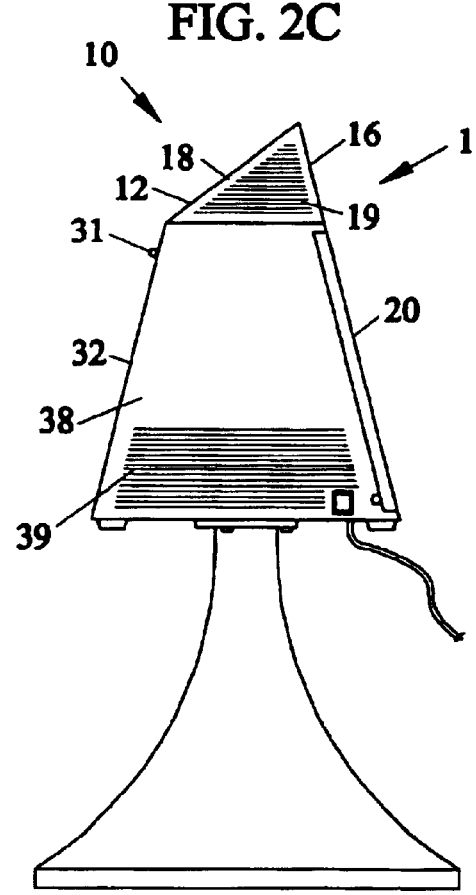
FIG. 2C is a side view of the assembled apparatus of FIG. 2A along arrow 2C.

FIG. 1 is an exploded perspective view of a first preferred embodiment 1 of the self-contained air cleaning and circulating pyramid invention apparatus 1 with removable floor stand 40. FIG. 2A is a front view of the assembled apparatus 1 of FIG. 1 along arrow 2A. FIG. 2B is a top view of the assembled apparatus 1 of FIG. 2A along arrow 2B. FIG. 2C is a side view of the assembled apparatus 1 of FIG. 2A along arrow 2C.

Referring to FIGS. 1 and 2A–2C, apparatus 1 can be pyramid shaped and include an upper pyramid portion 10 having a triangular front face 12 sloped at approximately 45 degrees, and three side triangular faces 14, 16, 18 each at having the same sloped angle as the rest of the pyramid shaped apparatus 1. Two opposite sided faces 14 and 18 can have premolded, and/or adjustable louvered openings 15, 19 to direct the flow path of the incoming air. For example, the louvers 15, 19 can be angled upwardly so that incoming air comes into the apparatus at an angle of approximately 45 degrees. Having the slanted inlet openings in the upper pyramid portion 10 creates more surface area for the intake, allowing for more air to be drawn into the apparatus 1 than if the intake were vertical. This not only helps the UV destruction(which will described later) because it slows the air down increasing bacteria/virus exposure to the lamps, but it also helps minimize unit noise.

Beneath the upper portion 10 of the apparatus 1 can be a lower pyramid shaped portion 30 having three sides 32, 34, 38, each can have horizontal louvers 33, 35, 39 that can exhaust air both upward toward the ceiling and downward toward the floor. For example, the upper four horizontal rows of louvers 33, 35 and 39 can be angled to exhaust in an upward direction away from the apparatus 1(also, the angle can be different from the angles of the louvers of the upper pyramid portion 1), and the lower horizontal rows of louvers 33, 35, 39 can be angled to exhaust air in a downward angled direction toward the floor and away from the apparatus.

In operation, air can exhaust the apparatus 1 from the lower front 32, left 34, and right 38 of the cabinet(apparatus) 1. The air can be exhausted through louvers 33, 35, 39, directed both upwards toward the ceiling and downward toward the floor at 45° angle, creating an excellent airflow pattern capable of cleaning air at all levels within the room where the apparatus is to be located. Location of the louvers 33, 35, 39 vis-à-vis the blower (which will described in detail later) minimizes air turbulence within the cabinet 1 (air bouncing off of the inside of the cabinet), and minimizes air resistance, thereby lowering noise levels. Louvers/outlets 33, 35, 39 on three sides of the cabinet/apparatus 1 disperse clean air effectively to all parts of the room, regardless of the placement of the apparatus 1.

On the front face portion 32 of the lower pyramid portion 30 can be a see-through porthole 31(such as a refracting lens, and the like) which allows the user to visually see inside the apparatus 1 as needed to view lamp function. A removable back panel 20 which will be described in detail later can be attached across the back of the apparatus 1.

Upper pyramid portion 1 and lower pyramid portion 30, and back panel 20 can form a hollow self-contained cabinet that can be formed from molded plastic, and the like, and have bottom dimensions of approximately 16 inches by approximately 16 inches with a height of approximately 21 inches tall.

FIG. 3 is a side cross-sectional view of the assembled apparatus 1 of FIG. 2C showing air flow. Referring to FIGS. 1, 2A–2C, and 3, underneath the apparatus/cabinet 1, can be a removable floor stand 40 that can be cone or horn shaped having an upper flattened end 42 with fasteners 43 that can attach the stand 40 to the floor 39 of the cabinet/apparatus 1. An upper raised stem portion 41 of the stand can mateably fit into a cavity 37 in the floor 39. The lower end 46 of the stand 40 forms an enlarged base portion that can allow the apparatus 1 to be located on various floor locations. Stand 40 can also be formed from molded plastic, and the like. Also, attached to an undersurface of the floor 39 can be rubber type feet 36 which allow the cabinet/apparatus to be used on other surfaces such as tables and the like, to be described later.

Referring to FIGS. 1 and 3, the internal components of the apparatus/cabinet 1 can include a pre-filter for odors/chemicals and large particulates, such as a carbon pad and plastic filter basket 50, a light source 60 such as a UV(ultraviolet)light source, a second filter 70 for smaller particulates, such as a HEPA filter, a blower section 80, such as an impeller motor with blades, and components such as two speed rocker switch 92(which can also be a rheostat for variable speed control), capacitor(s) 94(for example, if two speed motorized impeller is used, one 8 uF capacitor to be used, and for example, if variable speed motorized impeller is to be used, one 8 uF and one 16 uF capacitor to be used), an electronic ballast 96 for the UV light source 60, and an exterior power cord 98 for allowing the apparatus 1 to be plugged into a 120 volt power supply. For example, the two speeds can include approximately 150 cfm for a low speed, and approximately 300 cfm for a high speed. A more detailed description of the important relevant components will now be described.

Referring to FIGS. 1 and 3, the pre-filter 50 can be an approximately 7½"×approximately 7½"×approximately ⅝" carbon pad designed not only to remove larger particulate from the air (thereby extending the life span of the more expensive HEPA filter) but also used to remove light odors/chemicals/gases. The carbon on the prefilter pad 50 can absorb light odors/chemicals and gases. Pulverized carbon such as that used on our prefilter has more surface area than larger carbon granules, creating a higher rate of carbon adsorption than standard carbon granules. (Carbon adsorbs odors when odors/chemicals of a certain size and configuration become trapped in the pores on the carbon. By pulverizing the carbon, more pores are exposed allowing for a higher rate of adsorption of odors/chemicals/gases than with carbon granules). The pad 50 can fit into a reusable filter basket 55 that secures the pad into place, and the basket 55 then slides into two filter rails 56, 58 located in the cabinet/apparatus 1. The rails 56, 58 holding the basket 55 into place can limit air bypass around the pre-filter 50 to ensure odors and larger particulate are removed The dark prefilter pad 50 can also act as a shield to help prevent exposure to direct UV light. To form an additional seal, upper surfaces of the rails 56, 58 can include a layer(s) of rubber gasket material.

The second filter 70 can be a HEPA filter. The apparatus can use an approximately 11½"×approximately 11½"× approximately 2 & 11/16" hospital grade HEPA filter, batch tested to achieve approximately 99.97% efficiency at approximately 0.3 microns. Unlike many commercial/residential HEPA filters that utilize HEPA media but whose finished filters are not tested, the HEPA filter used in this unit will be batch tested to ensure the filter's efficiency of approximately 99.97% efficient at approximately 0.3 microns. (In some commercial/residential units the media will be approximately 99.97% efficient at approximately 0.3 microns but the media is not gasketed and sealed within the filter frame to prevent air bypass around the media. As such, the filter itself may not be approximately 99.97% efficient at approximately 0.3 microns even though the media is).

Table 1 shows various types of particulate and their size, and the technologies able to trap/remove them from the air. It should be noted the size in microns of bacteria, mold spores, dust, etc., all of which can be removed by a certified HEPA filter such as the one to be used in the novel apparatus 1.

TABLE 1
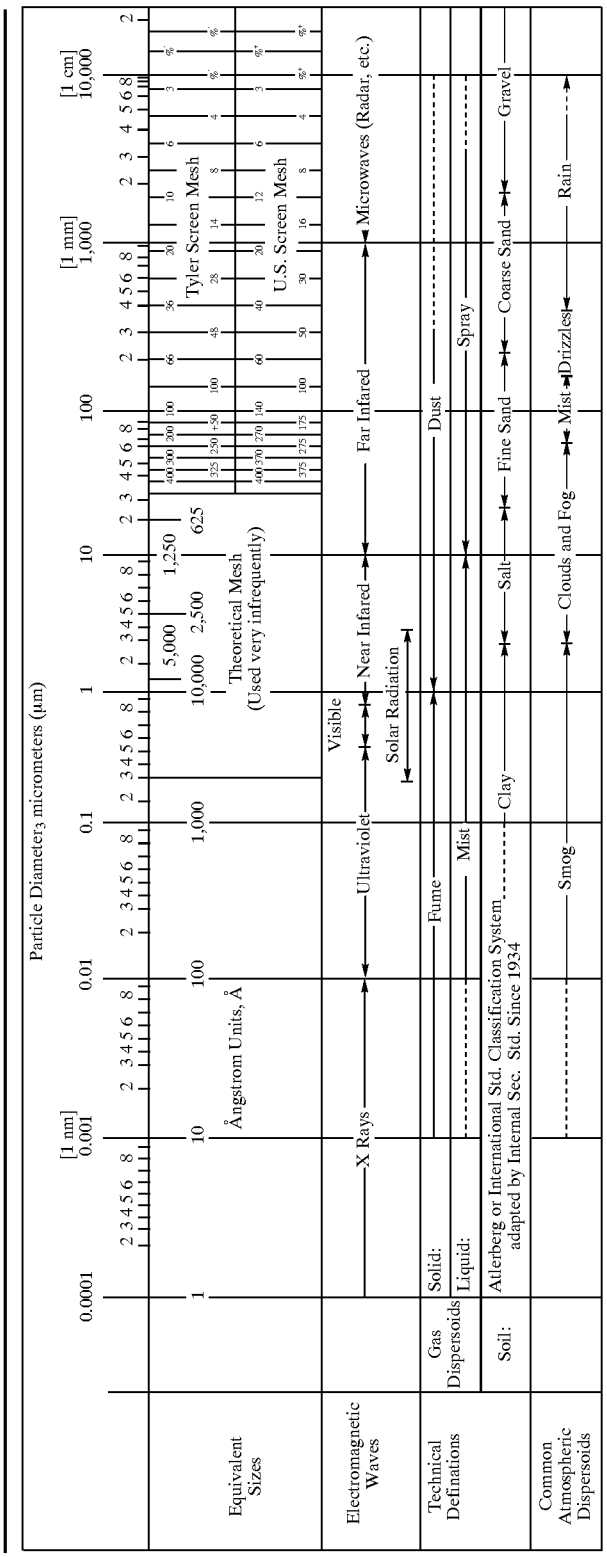

TABLE 1-continued
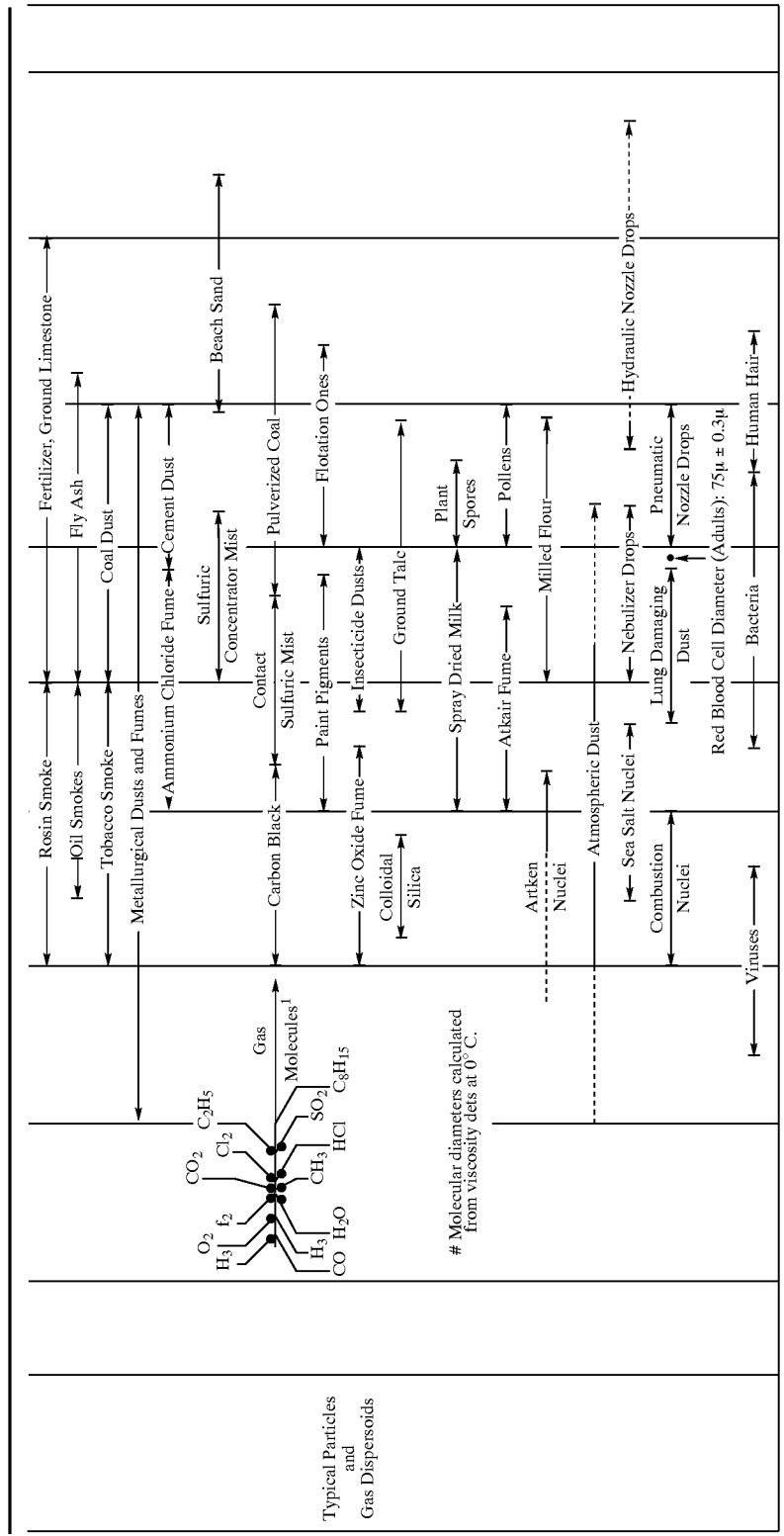

TABLE 1-continued

| Method for Particle Size Analysis | | | | | | | |
|---|---|---|---|---|---|---|---|
| | ←—Ultramicroscope+—→ | ←—Impingers—→ | | Electroformed Sieves | | | +Formulas average particle diameter but no size distrubition |
| | | ←—Electron Microscope+—→ | ←—Microscope—→ | ←—Sieving—→ | | | ++Size distulution may be obtained by special calibration |
| | ←—Ultracentrifuge—→ | ←—Centrifuge—→ | ←—Elutration—→ | | | | |
| | | ←—Turbodimentry—→ | ←—Sedimentation—→ | | | | |
| | ←—X-Ray Diffraction+—→ | ←—Permeability+—→ | | ←—Visible to Eye—→ | | | |
| | ←—Adsorption+—→ | | ←—Scanners—→ | | | | |
| | | ←—Light Scattering++—→ | ←—Electrical Conductivity—→ | ←—Machine Tools (micrometers, Calpers, etc.)—→ | | | |
| | ←—Nuclei Counter—→ | | | | | | |
| Types of Gas Cleaning Equipment | Ultrasonics (very loaded industrial application) | | ←—Centrifugal Seperators—→ | ←—Setting Chambers—→ | | | |
| | | ←—Liquid Scrubbers—→ | | | | | |
| | | ←—Cloth Collectors—→ | | | | | |
| | | ←—Packed Beds—→ | | | | | |
| | ←—High Efficency Air Filters—→ | | ←—Common Air Filters—→ | ←—Impingement Seperators—→ | | | |
| | Thermal Precipation (used only for sampling) | | ←—Mechanical Seperators—→ | | | | |
| | ←—Electrical Precipitators—→ | | | | | | |

Table 1 comes from "The 1997 ASHRAE Handbook—Fundamentals," I-P Editon, American Society of Heating, Refrigerating, and Air-Conditioning Engineers, Inc., 12.3, 1997.

Referring to FIGS. 1 and 3, the UV(ultraviolet) Lamp 60 can include a 9 W UVGI (Ultraviolet Germicidal Irradiation) lamp that continually shines on the dirty side 71 of the HEPA filter 70 (this is the side of the HEPA filter that the particulate and biological contaminants are trapped on). UV lamp(s) 60 can be supported on an interior ledge 66 of the apparatus 1 by socket mount 65. Each of the lamp(s) 60 can be easily removed when the need exists for servicing the bulbs. UV radiation has been proven to deactivate and destroy microorganisms under certain conditions. Table 2 shows various UV Dosages required for complete destruction of various bacteria, viruses, yeast, molds, and the like, which can be achieved with the novel invention apparatus 1.

TABLE 2

UV dosage required for complete destruction of various microorganisms of Molds, Bacteria, Viruses and Yeast

| | Dosage in micro-watt sec/cm$^2$ |
|---|---|
| MOLDS | |
| ASPERGILLUS AMSTELODAMI | 77,000 |
| ASPERGILLUS FLAVUS | 99,000 |
| ASPERGILLUS GLAUCUS | 88,000 |
| ASPERGILLUS NIGER (BREAD MOLD) | 330,000 |
| MUCOR RACEMOSUS | 35,200 |
| OOSPORA LACTIS | 11,000 |
| PENICILLIUM CHRYSOGENUM | 56,000 |
| PENICILLIUM DIGITATUM | 88,000 |
| PENICILLIUM EXPANSUM | 22,000 |
| RHIZOPUS NIGRICANS (CHEESE MOLD) | 220,000 |
| BACTERIA | |
| BACILLUS ANTRACIS SPORES | 46,200 |
| BACILLUS SUBTILIS SPORES | 22,000 |
| CLOSTRIDIUM TETANI | 23,100 |
| CORYNEBACTERIUM DIPPTHERIAE | 6,500 |
| DYSENTERY BACILLI | 4,200 |
| ESCERICHIA COLI | 6,600 |
| LEGIONELLA PNEUMOPHILA (LEGIONNAIRES DISEASE) | 2,760 |
| INFECTIOUS JAUNDICE | 6,000 |
| MYCOBATERIUM TUBERCULOSIS | 10,000 |
| RHODOSPIRILLUM RUBRUM | 6,100 |
| SALMONELLA ENTERITIDIS | 10,000 |
| SALMONELLA TYPHOSA (TYPHOID FEVER) | 26,400 |
| SALMONELLA | 6,160 |
| SHIGELLA DYSENTERIAE-DYSENTERY | 3,400 |
| STAPHLYLOCOCCUS AUERUS | 6,600 |
| STREPTOCOCCUS PYROGENES | 4,200 |
| STREPTOCOCCUS SALIVARIUS | 4,200 |
| VIRUSES | |
| INFECTIOUS HEPATITIS | 8,000 |
| INFLUENZA | 3,400 |
| YEASTS | |
| SACCHAROMYCES CEREISIAE | 13,200 |
| SACCHAROMYCES ELLIPSOIDEUS | 13,200 |

The above UV Dosages were determined by WestingHouse, GE, and other sources

Ultraviolet(UV) dosage is a function of the intensity of the UV light, and the amount of time the microorganisms are exposed to that light (referred as Residence Time). The limitation of most UV systems is there is rarely enough UV dosage created to destroy bacteria or viruses. This is primarily because not enough residence time is achieved, in that the small number of lamps used in most units does not create enough radiation intensity to overcome air flow in the unit.

The inventors have solved this problem by placing the UV lamp 60 before the HEPA filter 70 as shown in FIGS. 1 and 3. While HEPA filters have been the standard for high risk infection control in hospitals and laboratories (because they have been proven to remove biological contaminants, as shown in Table 1 above), they require at least annual replacement due to biological contamination. As microorganisms collect on the HEPA filter 70 over a long period of time, there is a risk of bacteria and mold growth on the HEPA filter 70 as trapped bacteria/mold live, grow, and feed on the filter (especially in warm and humid environments). This is sometimes called bacteria "grow-through" whereby microorganisms live and breed on the HEPA media, eventually eating through the media. This ruins the integrity of the HEPA filter and can create more contamination within the room as the microorganisms/mold are dispersed by the air cleaner.

By having the UV lamp 60 continually bathing the HEPA filter 70, the bacteria and mold collected on the surface 71 of the filter 70 are destroyed and deactivated over time. This is because an "infinite" residence time is produced, as the bacteria/mold are exposed to the UV light from UV lamp 60 as long as the unit remains on. As such, despite the fact that the UV lamp 60 is relatively low intensity given the air flow of the unit (approximately 300 cfm), the UV dosage required for complete destruction is created for the trapped microorganisms because the mold/bacteria will always be exposed to the UV lamp 60, regardless of how much air is passing through the unit.

Referring to FIGS. 1 and 3, the second filter 70, such as the HEPA filter, can be inserted and removed from the cabinet/apparatus 1, by being slid on rails 76, 78, which can also include gasket rubber top layers for allowing a good seal between the edges of the filter 70 and the interior sides of the cabinet/apparatus 1, so that no air passes around the side edges of filter 70.

The airflow patterns of the novel apparatus 1 will now be described in reference to FIGS. 1, 2A, 2B, 2C and 3. A novel key to any air cleaner is the airflow pattern that it creates. A device can utilize the best air cleaning technology in the world, but if the clean air is not dispersed throughout the room and if all of the room's dirty air is not drawn through the device, then the device's overall effectiveness and efficiency is limited. The airflow pattern created by the novel invention produces an excellent mixing factor and cleans all parts of the room space in which the apparatus 1 is located. Furniture and other room masses that can be disastrous to other unit's airflow patterns have limited affects on the novel invention. This is due to the exhaust louvers 33, 35, 39, the velocity of the air traveling out of the apparatus 1, and the location of the air intake coming in through upper louvers 15, 19.

In the novel invention as depicted in FIG. 2, dirty air can be drawn in by various directions shown by arrows I1 through the top 10 of the apparatus 1. Air then passes through the various filtration stages of a first pre-filter 50, followed by air flowing in the direction of arrows I2 past UV light(s) 60, followed by the air passing in the direction of arrows 13 through second filter 70, followed by the cleaned being pulled through blades 82 of a blower 80 before being exhausted out of the lower portion 30 of the apparatus 1 in various upward and downward directions as indicated by arrows I5. The cleaned air as indicated by arrows I5, can be directed by the louvered exhausts 33, 35, 39 that can be molded into the cabinet in two primary directions: approximately 45° angle toward the ceiling, and approximately 45° angle toward the floor.

The velocity of the air being exhausted at an air flow of up to approximately 300 cfm is high enough to effectively move large volumes of air long distances. As such, the combination of the velocity/air flow of the air and the direction the air is being exhausted effectively pushes contamination from all levels of the room up toward the ceiling and out of the breathing zone, where it can be drawn back into the unit.

Referring to FIGS. 1, 2A, 2B, 2C and 3, the cleaned air can be exhausted in the direction of arrow I5 out louvers 33, 35, 39 of three sides 32, 34, 38 of the apparatus 1 (front, and both sides). Therefore, the airflow pattern described above not only occurs in the area directly in front of the apparatus, but also to each side. Thus, the novel invention apparatus 1 can effectively clean all corners of a room space, and all levels of air within the room.

Table 3 shows the air changes per hour that the novel invention apparatus can achieve in various sizes of room spaces.

TABLE 3

| Square feet of room* | Air changes per hour created** |
|---|---|
| 80 ft$^2$ | 28.1 ACH |
| 100 ft$^2$ | 22.5 ACH |
| 150 ft$^2$ | 15.0 ACH |
| 200 ft$^2$ | 11.3 ACH |
| 250 ft$^2$ | 9.0 ACH |
| 300 ft$^2$ | 7.5 ACH |
| 350 ft$^2$ | 6.4 ACH |
| 400 ft$^2$ | 5.6 ACH |
| 450 ft$^2$ | 5.0 ACH |
| 500 ft$^2$ | 4.5 ACH |
| 550 ft$^2$ | 4.1 ACH |
| 600 ft$^2$ | 3.8 ACH |
| 650 ft$^2$ | 3.5 ACH |
| 700 ft$^2$ | 3.2 ACH |
| 750 ft$^2$ | 3.0 ACH |

Referring to Table 3, * refers to 8' ceilings,  refers to Air Changes Per Hour: Term used to measure room airflow (ventilation) rates. ACH is a measure of the rate (time) it takes to clean/remove all of the air in the room, and replace it with clean/fresh air. For example, if approximately 9 ACH are created in a room, then all of the air in the room will be cleaned approximately 9 times per hour, and * approximately 300 cfm used to make calculations.

FIG. 4A is an enlarged view of the safety interlock switch 90 of FIG. 3 with a closed back panel 20. FIG. 4B is another view of the interlock switch 90 of FIG. 4A with back panel 20 in an open position. FIG. 5A is a side view of the apparatus 1 of the preceding figures separated from the back panel 20. FIG. 5B shows the apparatus 1 of FIG. 5A with upper ridge 22 of back panel 20 being connected to apparatus 1. FIG. 5C shows the apparatus 1 of FIG. 5B with back panel 20 now moved to a closed position. FIG. 5D is an enlarged view of the locking fastener 99 for the back panel 20 of the apparatus 1.

Referring to FIGS. 4A, 4B and 5A–5D, the removable back panel 20 can be initially attached to the rest of apparatus 1, by inserting an upper ridge portion 22 of the back panel in a slot portion underneath lower ledge 17 of upper rear panel 16 as shown by arrow J1. Next, back panel 20 can pivot against lower edge 17 so that a bottom portion 24 of back panel 20 rotates in the direction of arrow J2 to close up the rear opening to apparatus/cabinet 1. Finally, a removable locking fastener 99, such as a screw, and the like can be inserted into a through-hole 97 in a fixed socket 96 in the apparatus 1, and a through-hole 27 that is in a rear facing tab portion 26 connected to an interior side lower portion of back panel 20.

Additionally, a safety lock switch 90 becomes activated and deactivated by the opening and closing of back panel 20. When back panel 20 is in a closed position(FIG. 4A), tab tip 28 has pressed inward and bent metal rod 94, which creates an electrical circuit within the housing 92 of safety lock 90 so that power can be supplied to internal components within apparatus 1. When back panel 20 is opened(FIG. 4B) the metal rod 94 can bend back to a prebent position where an interior switch inside housing 92 is no longer connected. Thus, with back panel 20 opened, no power is supplied to internal electrical components within apparatus/cabinet 1. A basic interlock power interlock switch that can be used with the invention would be part No. D44LR1LD by Cherry Electric Corp.

Figure 6:
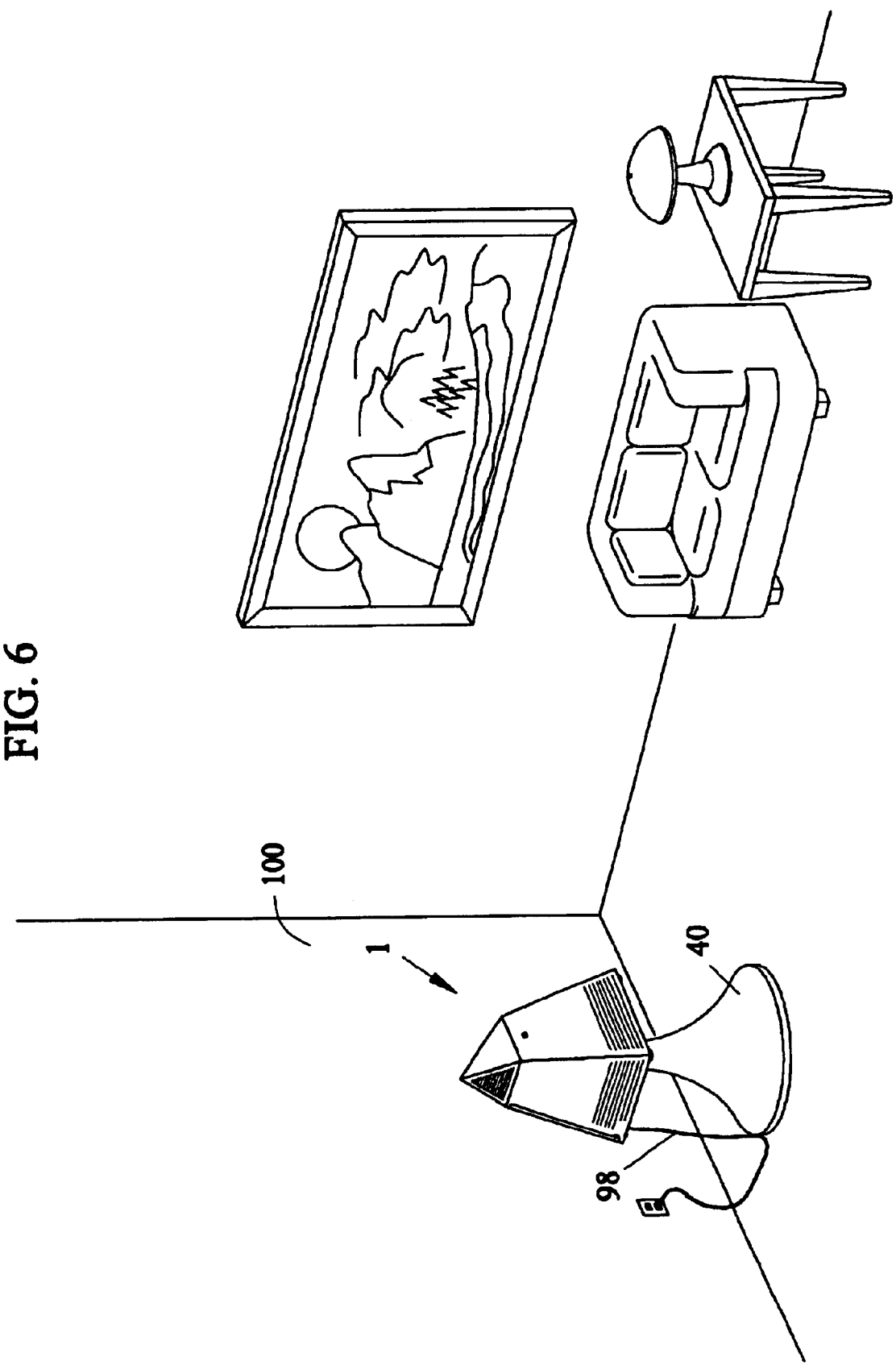
FIG. 6 is a perspective view of the apparatus and stand positioned in a room space.

FIG. 6 is a perspective view of the apparatus 1 and stand 40 positioned in a room space, where positioning the novel apparatus against a mid portion of a wall 100 can allow for substantially all the air in the room space to be cleaned.

Figure 7:
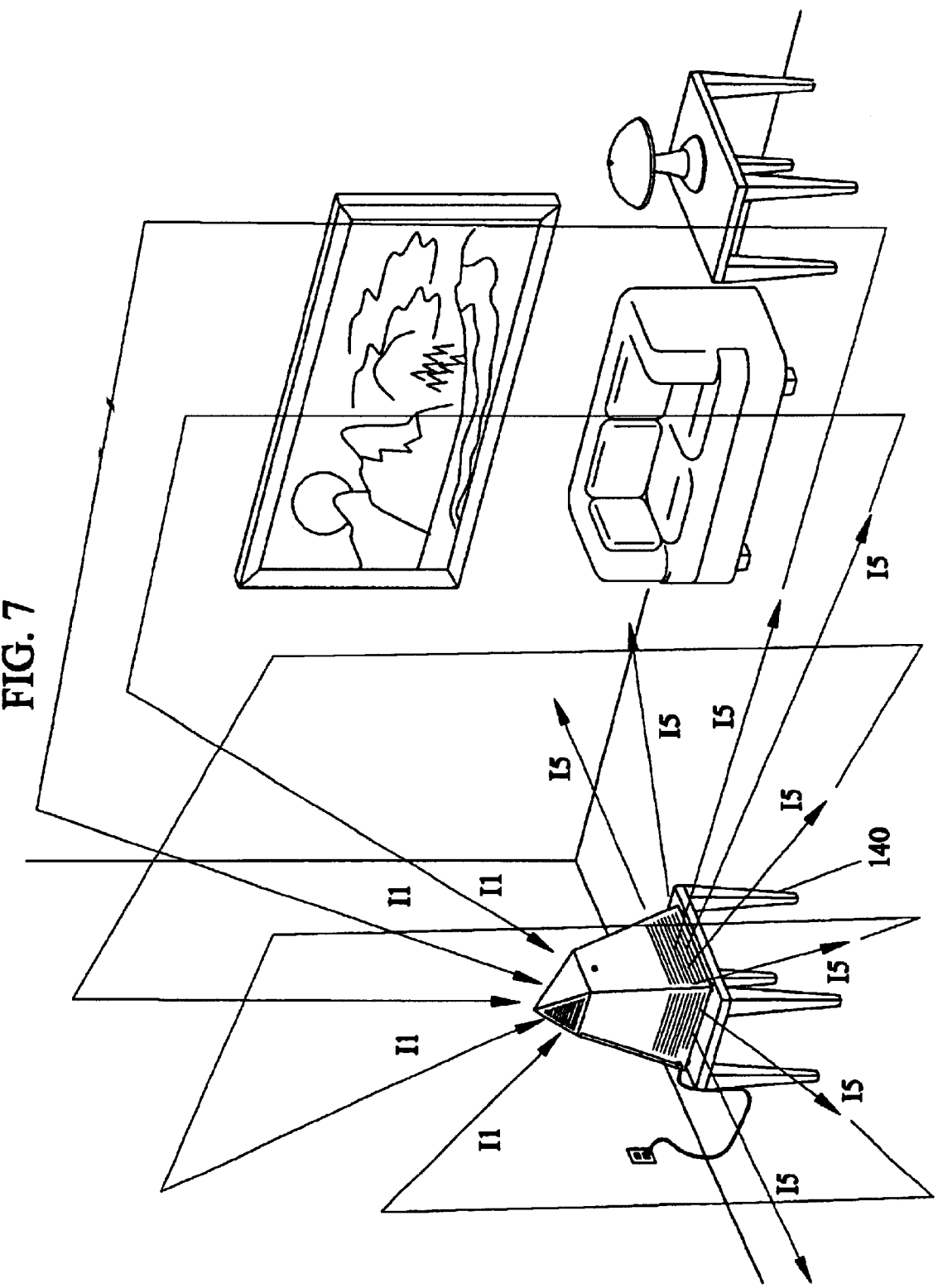
FIG. 7 is a perspective view of the apparatus of the preceding figures without the stand being positioned on a table.

FIG. 7 is a perspective view of the apparatus of the preceding figures without the stand 40 being positioned on a table 140. The rubber feet 36(shown more clearly in FIGS. 2A, 2C, 3, 4A–4B, allow the novel apparatus 1 to be safely positioned on any support surface without the danger of scratching and damaging the surface, and the rubber acts as a gasket to prevent noticeable vibrations and noise. Arrows I1 refer to dirty air that can come from various diretons into novel air cleaning apparatus 1, and arrows I5 refers to the direction of cleaned air being exhausted from the novel air cleaning apparatus 1.

Figure 8:
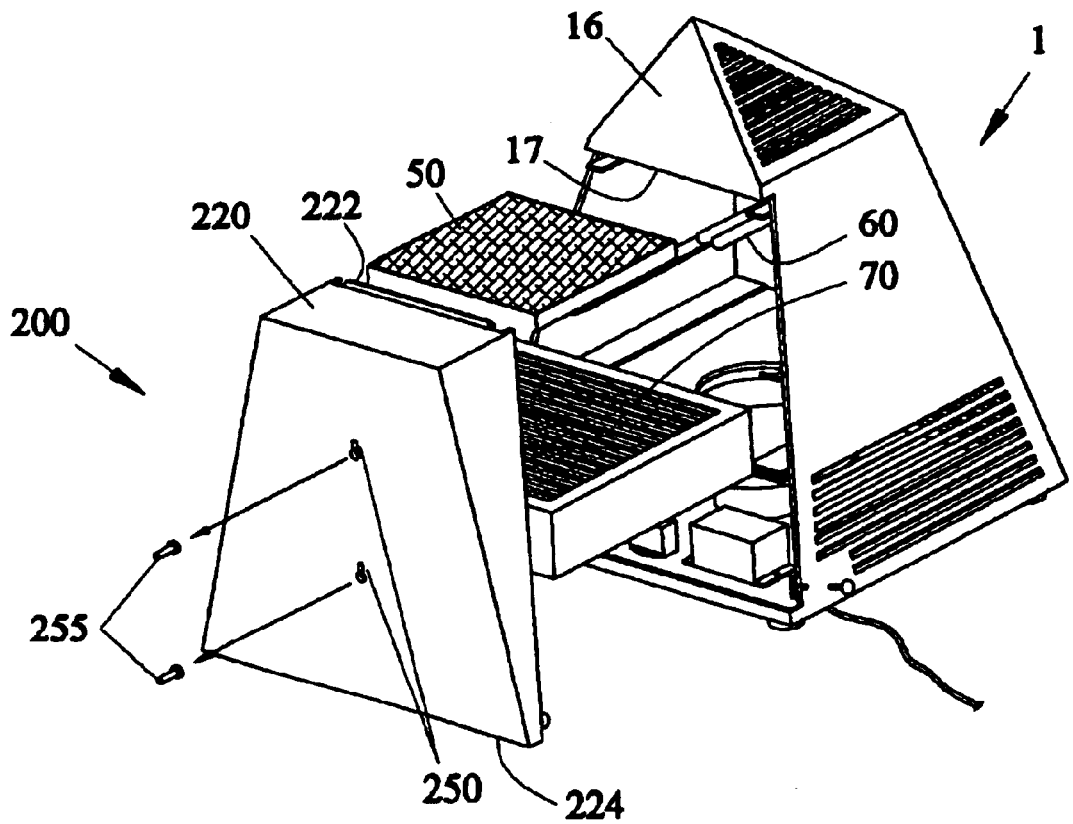
FIG. 8 is an exploded view of the apparatus of the preceding figures with wall mount.
Figure 9:
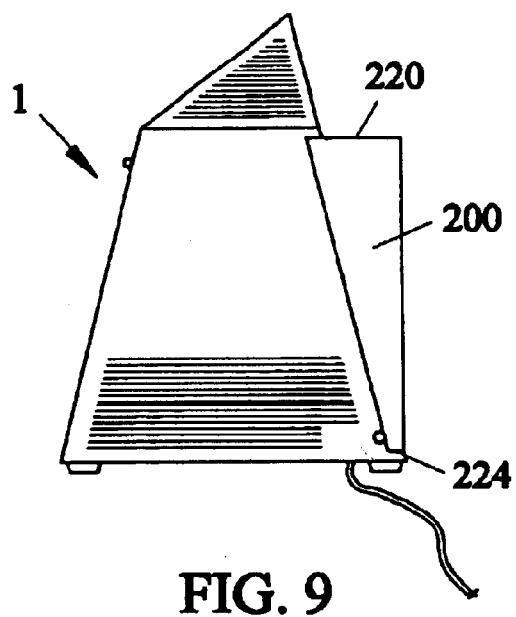
FIG. 9 is a side assembled view of the wall mount and apparatus of FIG. 8.
Figure 10:
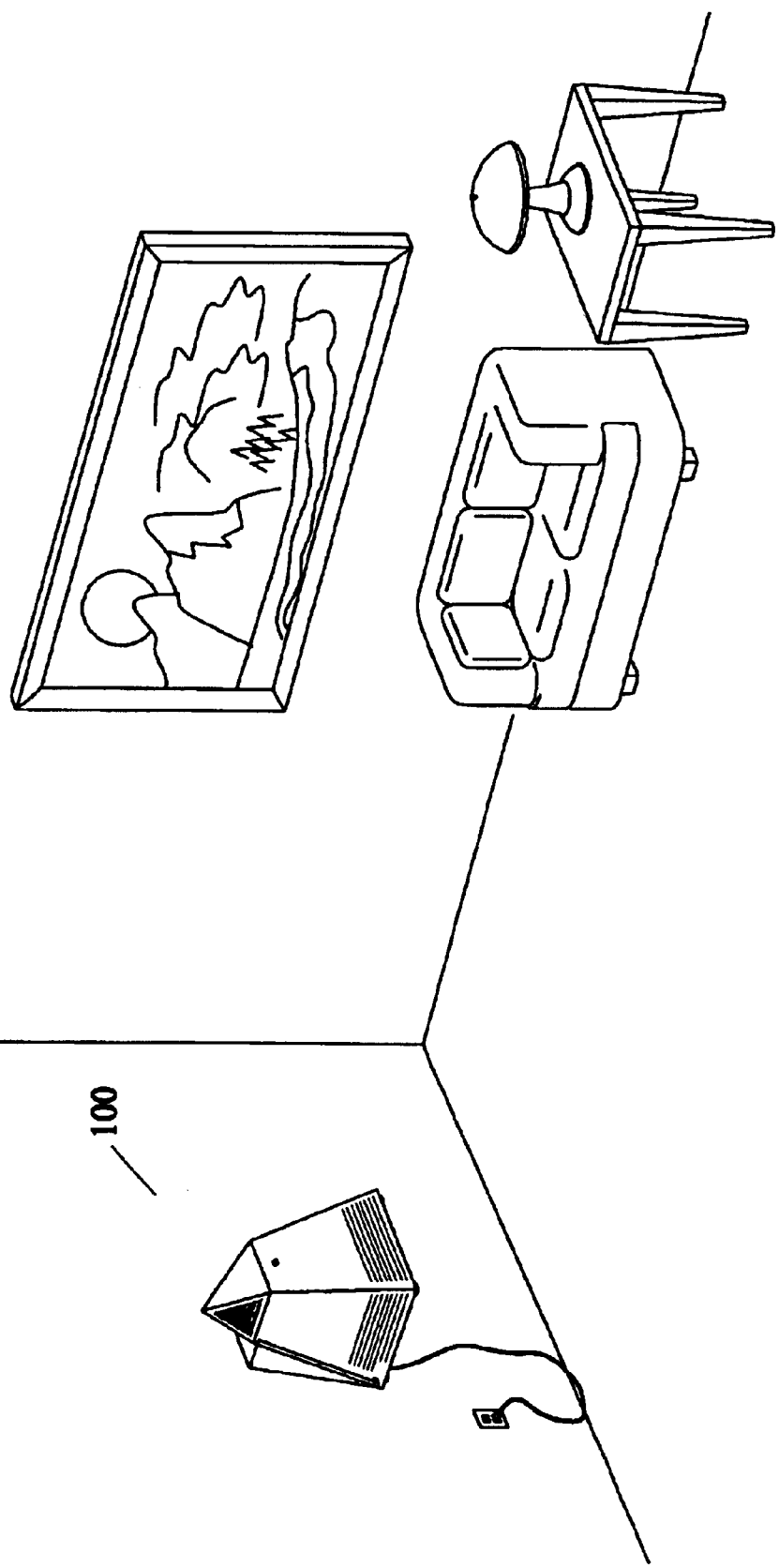
FIG. 10 is a perspective view of the apparatus of FIGS. 8–9 mounted on a wall.

FIG. 8 is an exploded view of the apparatus of the preceding figures with a novel wall mount 200 that can be used in place of the back panel 20 of the previous figures. FIG. 9 is a side assembled view of the wall mount 200 and apparatus 1 of FIG. 8. Wall mount 200 can have an upper end 220 having an internal ridge 222 similar to ridge 22 of the back panel 20 of the previous figures that can be similarly attached up to lower edge 17 and under upper rear panel 16 of the apparatus 1. Wall mount attaches to the rest of apparatus/cabinet 1 similar the back panel 20 of the previous figures. The wall mount 200 can have a similar shape to the back panel 20, but instead has a wider upper end 220, than the lower end portion 224, so that the wall mount has when viewed sideways, an upside down triangular shape, as shown by FIG. 9. Across the back of wall mount 200 can be keyhole shaped slots 250(two are shown, but the invention can include one, three or more, as needed). Flat headed fasteners 255 preconnected to desired locations on a wall type surface 100(see FIG. 10), allow for the keyholes 250 of the wall mount 200 to support the apparatus 1. Similar to the stand supported apparatus and the table supported apparatus, the novel wall mounted apparatus 1 mounted at a selected height, can allow for clean air to be directed through all heights within the room space as needed.

While preferred embodiment shows the upper portion and lower portion of the apparatus having four faces, the invention can be used with pyramid shapes having three faces, five or more.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A self contained air purification apparatus, comprising: upright pyramid with upper face portions, and lower face portions;

an air inlet port on at least one of the upper face portions for receiving incoming air;

means for filtering the incoming air inside the apparatus;

means for pulling the air through the apparatus; and an exhaust port on at least one of the lower face portions, spaced below the inlet port for allowing cleaned air to be substantially circulated out the apparatus.

2. The apparatus of claim 1, wherein the air inlet port is located on two faces of the pyramid.

3. The apparatus of claim 1, wherein the pyramid includes:

an upper pyramid portion separate from a lower pyramid portion, the upper pyramid portion having at least one face with a different slanted angle than at least one other face.

4. The apparatus of claim 1, wherein the exhaust port is located on three faces.

5. The apparatus of claim 1, wherein the pyramid includes: three exterior faces.

6. The apparatus of claim 1, wherein the pyramid includes: four exterior faces.

7. The apparatus of claim 1, wherein the pyramid includes: five exterior faces.

8. The apparatus of claim 1, wherein the pulling means includes:

means for circulating up to approximately 300 cfm of cleaned air.

9. The apparatus of claim 1, further comprising:

a UV(ultra violet) source positioned adjacent and above a surface of the filtering means for simultaneously cleaning both the incoming air and the filtering means, so that at least one of: bacteria, viruses and mold, is cleaned and filtered from the incoming air.

10. The apparatus of claim 1, wherein the filtering means includes:

a HEPA filter tested to achieve up to approximately 99.97% efficiency at approximately 0.3 microns.

11. The apparatus of claim 1, further comprising:

at least one removable filter for the filtering means; and means for sealing edges of the at least one filter, within the apparatus so that incoming air does not bypass the at least one filter.

12. The apparatus of claim 11, wherein the sealing means includes:

a gasket and rail for allowing the at least one filter to slide in and out of the apparatus.

13. The apparatus of claim 1, further comprising:

a removable back panel on the apparatus so that components within the apparatus can be serviced without using extra tools to open and access the components in the apparatus.

14. The apparatus of claim 13, further comprising:

means for automatically turning off power to the apparatus when the removable back panel is opened.

15. The apparatus of claim 1, wherein the filtering means includes:

a carbon filter positioned within the apparatus for removing odors and chemicals; and a HEPA filter positioned below the carbon filter; and a UV lamp positioned between the carbon filter and the HEPA filter.

16. The apparatus of claim 1, further comprising:

a removable floor based stand for positioning the apparatus above various floor locales.

17. The apparatus of claim 1, further comprising:

means for mounting the apparatus to various wall height positions.

18. A method of cleaning and circulating air from a self-contained system, comprising the steps of:

providing an air cleaning device having pyramid shaped exterior walls;

pulling incoming air into at least one upper face portion on at least one of the pyramid shaped exterior walls;

filtering the air inside the device; and exhausting resultant air from at least one lower face portion of the pyramid shaped exterior walls of the device below the at least one upper face portion of the pryamid shaped exterior walls.

19. The method of claim 18, wherein the exhausting step includes the step of:

circulating up to approximately 300 cfm of cleaned air into a space.

20. The method of claim 18, wherein the exhausting step includes the step of:

exhausting the resultant air through at least two faces of the pyramid shaped walls.

21. The method of claim 18, further comprising the steps of:

providing at least one filter for the step of filtering; and simultaneously cleaning the incoming air and the at least one filter with light having a wavelength which provides for removal of bacteria, viruses, and mold.

22. The method of claim 21, wherein the step of simultaneously cleaning includes the step of:

simultaneously bathing a side of the filter where contaminants collect, and the incoming air with UV(ultraviolet) light.

23. The method of claim 18, wherein the step of filtering includes the steps of:

removing odors with a first filter positioned adjacent to the incoming air; and removing particulates of up to approximately 0.3 microns with a second filter positioned below the first filter.

24. The method of claim 23, further comprising:

destroying at least one of bacteria, viruses and mold, from the incoming air passing between the first filter and the second filter.

25. The method of claim 18, further comprising the step of:

sealing sides of a filter within the apparatus so that incoming air does not bypass the filter.

26. The method of 18, further comprising the step of:

accessing interior components within the device with a removable panel; and servicing components within the device without using tools.

27. The method of claim 26 further comprising the step of:

automatically shutting off power to the components when the removable panel is opened.

28. The method of claim 18, further comprising the step of:

attaching a removable stand to the device for supporting on various floor locations.

29. The method of claim 18, further comprising the step of:

mounting the device to various wall location heights with a removable mount.

30. The method of claim 18, further comprising the step of:

supporting the device on a surface of a table.

31. A self contained air purification apparatus, comprising:

sloped angled exterior walls on the apparatus;

an air inlet port adjacent to a top portion of the apparatus for receiving incoming air;

means for filtering the incoming air inside the apparatus;

means for positioning a UV source adjacent and above a surface of the filtering means where microorganisms and mold become collected;

means for pulling the air through the apparatus; and an exhaust port adjacent to a lower portion of the apparatus spaced below the inlet port for allowing cleaned air to be substantially circulated about the apparatus.

32. A self contained air purification apparatus, comprising:

sloped angled exterior walls on the apparatus;

an air inlet port adjacent to a top portion of the apparatus for receiving incoming air;

means for filtering the incoming air inside the apparatus; at least one removable filter for the filtering means; and means for sealing edges of the at least one filter, within the apparatus so that incoming air does not bypass the at least one filter, the sealing means having a gasket and rail for allowing the at least one filter to slide in and out of the apparatus;

means for pulling the air through the apparatus; and an exhaust port adjacent to a lower portion of the apparatus spaced below the inlet port for allowing cleaned air to be substantially circulated about the apparatus.

33. A self contained air purification apparatus, comprising:

sloped angled exterior walls on the apparatus;

an air inlet port adjacent to a top portion of the apparatus for receiving incoming air;

means for filtering the incoming air inside the apparatus;

means for pulling the air through the apparatus;

an exhaust port adjacent to a lower portion of the apparatus spaced below the inlet port for allowing cleaned air to be substantially circulated about the apparatus; and a removable back panel on the apparatus so that components within the apparatus can be serviced without using extra tools to open and access the components in the apparatus.

34. A self contained air purification apparatus, comprising:

sloped angled exterior walls on the apparatus;

an air inlet port adjacent to a top portion of the apparatus for receiving incoming air;

a carbon filter positioned within the apparatus for removing odors and chemicals;

a HEPA filter positioned below the carbon filter;

a light source between the carbon filter and the HEPA filter;

means for pulling the air through the apparatus; and an exhaust port adjacent to a lower portion of the apparatus spaced below the inlet port for allowing cleaned air to be substantially circulated about the apparatus.

35. A self contained air purification apparatus, comprising:

sloped angled exterior walls on the apparatus;

an air inlet port adjacent to a top portion of the apparatus for receiving incoming air;

means for filtering the incoming air inside the apparatus;

means for pulling the air through the apparatus;

an exhaust port adjacent to a lower portion of the apparatus spaced below the inlet port for allowing cleaned air to be substantially circulated about the apparatus; and supporting the apparatus on one of: a removable floor based stand, and a wall mount.

36. A method of cleaning and circulating air from a self-contained system, comprising the steps of:

providing an air cleaning device having outwardly sloping exterior walls;

pulling incoming air into at least one upper face portion on at least one of the walls;

filtering the air inside the device;

exhausting resultant air from at least one lower face portion of the walls of the device, the lower face portion located beneath the upper face portion;

accessing interior components within the device with a removable panel; and servicing components within the device without using tools.

37. A method of cleaning and circulating air from a self-contained system, comprising the steps of:

providing an air cleaning device having outwardly sloping exterior walls;

pulling incoming air into at least one upper face portion on at least one of the walls;

filtering the air inside the device;

exhausting resultant air from at least one lower face portion of the walls of the device, the lower face portion located beneath the upper face portion; and supporting the device on one of: a floor based stand and a wall mount.

* * * * *